(12) United States Patent
Geyer et al.

(10) Patent No.: US 8,306,952 B2
(45) Date of Patent: Nov. 6, 2012

(54) TECHNIQUE FOR MANAGING MESSAGES

(75) Inventors: Hans-Dieter Geyer, Mannheim (DE); Peter Surma, Heidelberg (DE); Vera Roos, Ludwigshafen (DE)

(73) Assignee: SAP AG, Walldorf (DE)

( * ) Notice: Subject to any disclaimer, the term of this patent is extended or adjusted under 35 U.S.C. 154(b) by 812 days.

(21) Appl. No.: 11/093,333

(22) Filed: Mar. 29, 2005

(65) Prior Publication Data
US 2006/0221988 A1 Oct. 5, 2006

(51) Int. Cl.
G06F 17/30 (2006.01)

(52) U.S. Cl. .................. 707/661; 709/207

(58) Field of Classification Search ........ 707/661–673; 709/200–253
See application file for complete search history.

(56) References Cited

U.S. PATENT DOCUMENTS

| | | | | |
|---|---|---|---|---|
| 5,787,153 | A * | 7/1998 | Bankay et al. | 379/88.18 |
| 5,933,413 | A * | 8/1999 | Merchant et al. | 370/234 |
| 6,167,427 | A * | 12/2000 | Rabinovich et al. | 709/201 |
| 6,167,438 | A * | 12/2000 | Yates et al. | 709/216 |
| 6,230,182 | B1 * | 5/2001 | Le et al. | 718/102 |
| 6,496,913 | B1 * | 12/2002 | Taugher et al. | 711/170 |
| 6,501,733 | B1 * | 12/2002 | Falco et al. | 370/235 |
| 6,587,915 | B1 * | 7/2003 | Kim | 711/103 |
| 6,643,652 | B2 * | 11/2003 | Helgeson et al. | 707/10 |
| 6,701,378 | B1 * | 3/2004 | Gilhuly et al. | 709/249 |
| 6,779,058 | B2 * | 8/2004 | Kishi et al. | 710/60 |
| 6,842,876 | B2 * | 1/2005 | Schilit et al. | 715/256 |
| 7,096,228 | B2 * | 8/2006 | Theimer et al. | 707/101 |
| 7,107,298 | B2 * | 9/2006 | Prahlad et al. | 707/640 |
| 7,134,053 | B1 * | 11/2006 | Moore | 714/47 |
| 7,136,882 | B2 * | 11/2006 | Collins et al. | 707/204 |
| 7,159,005 | B1 * | 1/2007 | Baber et al. | 709/200 |
| 7,167,880 | B2 * | 1/2007 | Amano et al. | 707/205 |
| 7,212,814 | B2 * | 5/2007 | Wilson et al. | 455/422.1 |
| 7,240,099 | B2 * | 7/2007 | Miyazaki et al. | 709/213 |
| 7,353,350 | B2 * | 4/2008 | Klassen et al. | 711/159 |
| 7,610,296 | B2 * | 10/2009 | Hughes et al. | 1/1 |
| 7,647,383 | B1 * | 1/2010 | Boswell et al. | 709/207 |
| 7,680,847 | B2 * | 3/2010 | Ebata et al. | 707/694 |
| 7,730,031 | B2 * | 6/2010 | Forster | 707/625 |
| 2004/0047594 | A1 * | 3/2004 | Towler | 386/46 |
| 2005/0193068 | A1 * | 9/2005 | Brown et al. | 709/206 |
| 2006/0026253 | A1 * | 2/2006 | Kessen et al. | 709/207 |
| 2006/0031305 | A1 * | 2/2006 | Keohane et al. | 709/206 |

* cited by examiner

Primary Examiner — Fred I Ehichioya
Assistant Examiner — Michelle Owyang
(74) Attorney, Agent, or Firm — Mintz, Levin, Cohn, Ferris, Glovsky and Popeo, P.C.

(57) ABSTRACT

A technique for managing messages stored in a messaging system may include determining whether messages designated for deletion within a current data container exceed a predetermined threshold. If such a determination is made, thereafter, a first amount of time required to delete the messages designated for deletion is calculated. A second amount of time required to copy the messages not designated for deletion in the current data container is also calculated. Thereafter, messages are selectively deleted or copied based at least in part on the calculated first and second amounts of time. In some variations, if the second amount of time exceeds the first amount of time (or exceeds the first amount of time by a predetermined threshold), then the messages designated for deletion are deleted. Otherwise, the messages not designated for deletion may be copied into a new data container and the current data container may be dropped.

14 Claims, 3 Drawing Sheets

TECHNIQUE FOR MANAGING MESSAGES

TECHNICAL FIELD

The following description relates to business systems, for example, a messaging system for use with an exchange infrastructure for collaborative business systems.

BACKGROUND

Software components that perform a certain function are known as applications. Applications are widely used in a variety of business processes, each being an execution of one or more Web services according to a description of an active business process. Business process applications are increasingly used in collaborative situations, that is, situations in which one or more applications receive data, such as messages, from another application.

A collaborative application environment typically relies on a precise messaging and transport layer for proper routing, addressing and transport of messages from one application to another. Collaborative business processes, however, tend to require a more sophisticated infrastructure that can execute real-time business logic.

For instance, in a messaging and transport layer, a messaging system (also referred to as a message exchange system) may transport messages as a payload in an envelope such as an extensible markup language (XML) file. The system may access the envelope, analyze the origin or sender of a message, and determine an intended recipient. The messaging and transport layer typically utilizes a database in which to store messages for persistence, at least until processing is complete.

In conventional high throughput messaging systems, the messaging system may receive a high volume of messages that must be processed and then deleted in the same sequence as they were received. The processing time from a message in a messaging system is usually short. After processing, the message can be reorganized (e.g., moved, saved, or deleted). If the input message rate exceeds or otherwise does not match the output message rate, the messaging persistence layer (e.g., database) may overfill. Such an overfill may result in the termination or delay of message processing, thereby affecting a wide variety of applications among an enterprise network.

If a message is to be deleted after processing, with conventional systems, each row in a database is deleted with a single delete. However, this delete operation can be relatively slow and create a rollback segment when a command word or other command instructing the database to save all changes made to the database is received. A delete function then deletes the entry and the rollback segment. This process tends to consume additional processing resources and may also delay messaging processing.

SUMMARY

A method for managing messages stored in a messaging system may include determining whether messages designated for deletion within a current data container exceed a predetermined threshold. If such a determination is made, then a first amount of time required to delete the messages designated for deletion is calculated. Also calculated is a second amount of time required to copy the messages not designated for deletion in the current data container to a new data container. Thereafter, the messages designated for deletion may be selectively deleted or the messages not designated for deletion may be selectively copied based at least in part on the calculated first and second amounts of time.

In some variations, if the second amount of time exceeds the first amount of time, the messages designated for deletion are deleted. If the first amount of time exceeds the second amount of time, then the messages not designated for deletion are copied into a new data container. Optionally, the current data container may be dropped or otherwise deleted.

In some variations, the first amount of time may be calculated based on the number of designated messages and a determined amount of time to delete a single message. Additionally or alternatively, the second amount of time may be calculated based on the number of non-designated messages and an amount of time to copy a single message. Optionally, the second amount of time may also be based on an amount of time needed to drop the current data container and/or to generate a new data container. For any determination based on amount of time, a threshold or other margin may be added or subtracted as desired for a particular implementation. In some variations, the first and second amounts of time are determined or otherwise provided by an administrator or other user. Such determinations may be based on past measurements or other statistical estimates.

The predetermined threshold for the number of designated messages may occur when the number of designated messages exceed the number of non-designated messages. Other factors may be taken into account when setting the threshold such as percentage of designated versus non-designated messages (65%/35%), delays in outputting messages, etc.

The data containers may be encapsulated in an application programming interface. The application programming interface may provide an interface for applications external to the messaging system to read, write, or change entries within the data container.

The method may process messages concurrently with one or all of the determining, calculating, and deleting steps. It may handle a wide variety of messages including invoices, orders, pictures, XML messages, WDSL messages, and SOAP messages.

The method may also include designating messages to be deleted. This designation may be based on a variety of factors including the amount of time since a particular message (or group of messages) was processed, the number of messages within the current data container, amount of free storage within the current data container, and the like.

An apparatus to manage messages may include a determination unit to determine whether messages designated for deletion within a current data container exceed a predetermined threshold. A calculation unit to calculate a first amount of time required to delete the messages designated for deletion, and to calculate a second amount of time required to copy messages not designated for deletion in the current data container to a new data container. In some variations, the first and second amounts of time are inputted into or otherwise provided to the calculation unit by an administrator or other user (that may have calculated the respective amounts of time). The apparatus may also comprise a deletion unit to selectively delete the messages designated for deletion based at least in part on the calculated first amount and second amounts of time, and a copy unit to selectively copy the messages not designated for deletion to the new data container based at least in part on the calculated first amount and second amounts of time.

In some variations, the calculation unit may calculate the first amount of time based on the number of designated messages and a determined amount of time to delete a single message. Additionally or in the alternative, the calculation unit may calculate the second amount of time based on the number of non-designated messages and an amount of time to copy a single message. Yet further, the calculation unit may calculate the second amount of time also based on an amount of time required to drop the current data container and to generate a new data container.

The messaging system may be coupled to a plurality of enterprise applications via a computer network or it may reside within a self-contained system. The data containers may be tables within a database or other storage device as may be desired.

Computer program products for managing messages, which may be embodied on computer readable-material, are also described. Such computer program products include executable instructions that cause a computer system to conduct one or more of the method steps described herein.

Similarly, computer systems are also described for managing messages. These computer systems may include a processor and a memory coupled to the processor. The memory may encode one or more programs that cause the processor to perform one or more of the method steps described herein.

BRIEF DESCRIPTION OF THE DRAWINGS

These and other aspects will now be described in detail with reference to the following drawings.

Like reference symbols in the various figures indicate like elements.

DETAILED DESCRIPTION

The systems and techniques described here relate to enterprise application integration. Specific embodiments include systems and methods employing a common persistence layer for executing message transport and business process logic services for messages communicated between applications through an enterprise application integration system.

Figure 1:
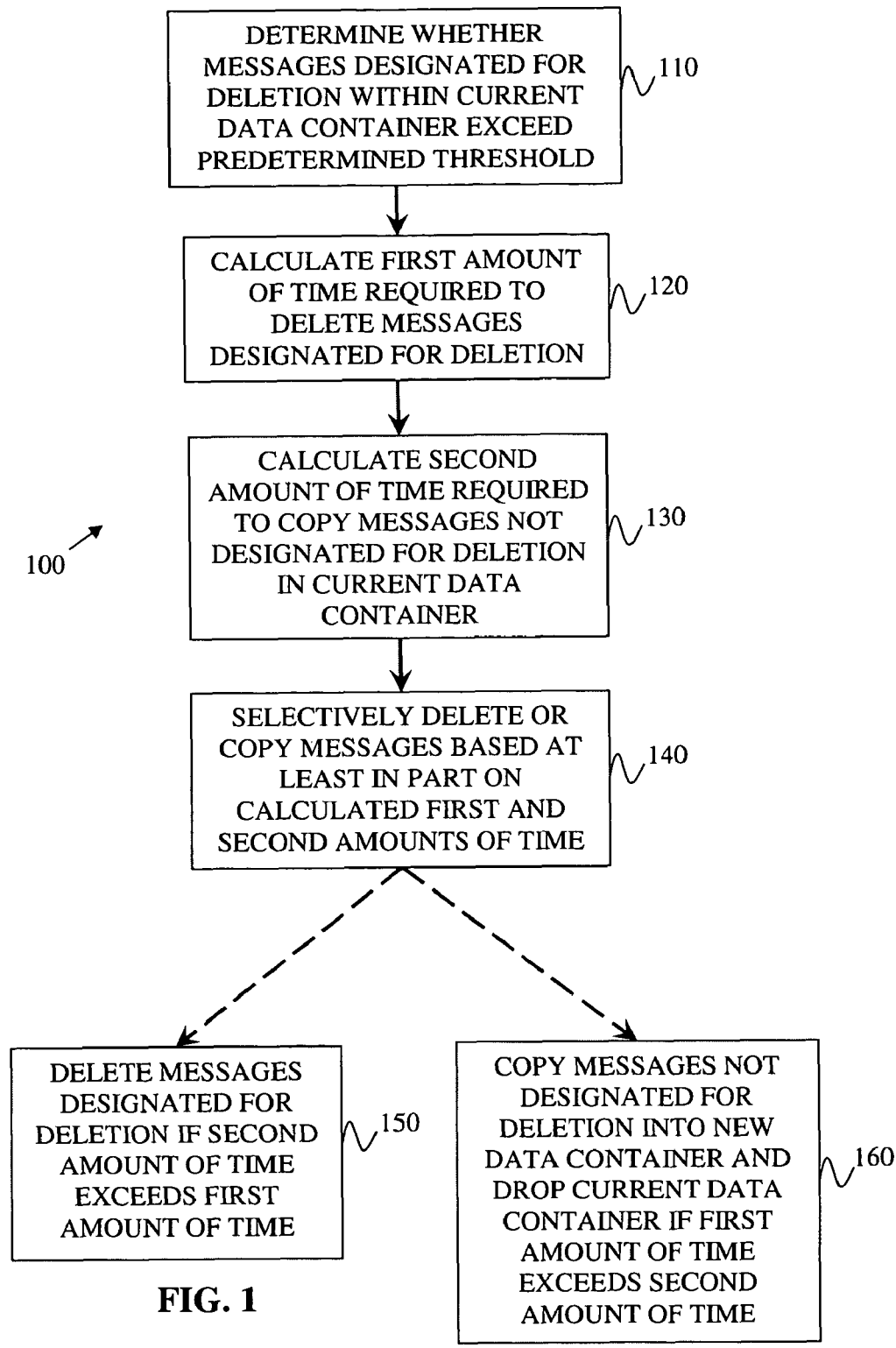
FIG. 1 is a process flow diagram illustrating a method for managing messages in a messaging system.

FIG. 1 illustrates a method 100 for managing messages stored in a messaging system. The method 100 may determine, at step 110, whether messages designated for deletion within a current data container exceed a predetermined threshold (although this step may be omitted if such a determination was previously or externally made). Thereafter, at step 120, a first amount of time to delete the messages designated for deletion may be calculated. At step 130, a second amount of time required to copy messages not designated for deletion in the current data container to a new data container is calculated. It will be appreciated that steps 120 and 130 may be conducted concurrently or step 130 may precede step 120. Next, at step 140, the messages are selectively deleted or copied based at least in part on the calculated first and second amounts of time.

In some variations, step 140 may include, as illustrated in step 150, deleting the designated messages if the second amount of time exceeds the first amount of time. Alternatively, step 140 may include, as illustrated at step 160, copying the non-designated messages into the new data container and dropping the current data container if the first amount of time exceeds the second amount of time.

Figure 2:
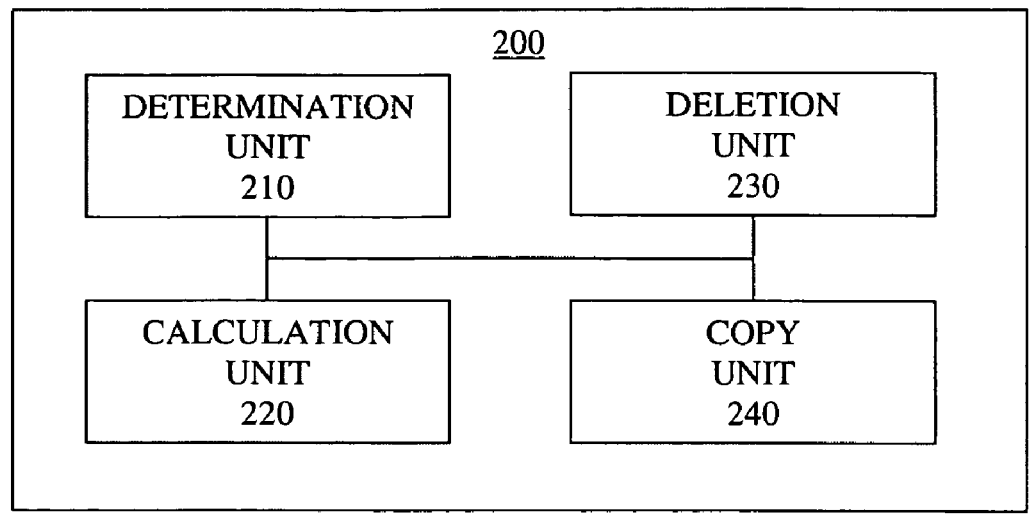
FIG. 2 is a schematic diagram illustrating an apparatus to manage messages in a messaging system.

FIG. 2 illustrates an apparatus 200 for managing messages stored in a messaging system. The apparatus 200 includes a determination unit 210 that determines whether a quantity of messages designated for deletion within a current data container exceeds a predetermined threshold. The apparatus may designate messages for deletion or it may receive a communication (e.g., a message) identifying the designated messages from an external source or device. A calculation unit 220 calculates a first amount of time required to delete the designated messages. The calculation unit 220 may also calculate a second amount of time required to copy non-designated messages in the current data container (although it will be appreciated that separate units may be adopted for the two calculations). Also included in the apparatus 200 is a deletion unit 230 that deletes the designated messages if the second amount of time exceeds the first amount of time. A copy unit 240 copies the non-designated messages into a new data container and drops the current data container if the first amount of time exceeds the second amount of time.

The following provides optional variations that may be implemented singly or in combination with the above identified method and apparatus. Background information useful for understanding and implementing the claimed subject matter is also described.

Figure 3:
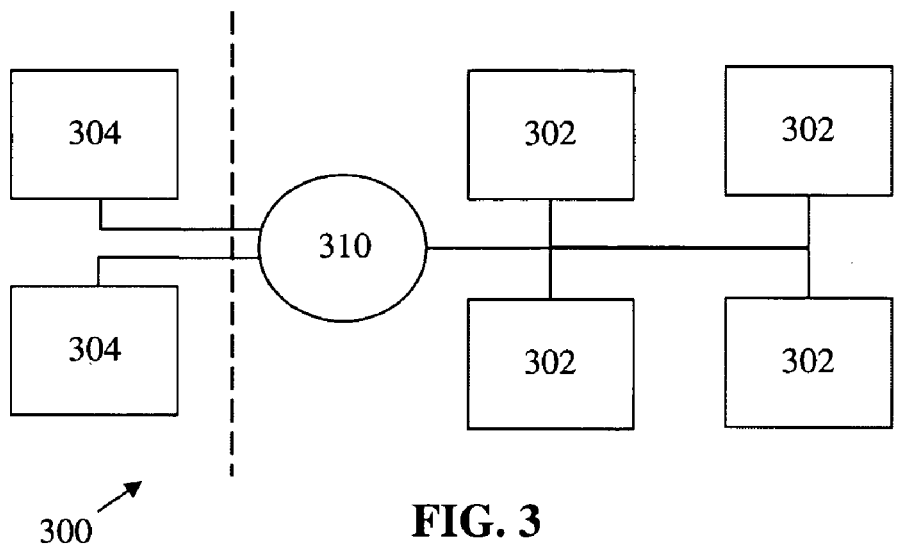
FIG. 3 is a block diagram of an integration application system useful for understanding and implementing the claimed subject matter.

FIG. 3 is a simplified block diagram of an application integration system 300 for integration and "loose coupling" (i.e., message-based interaction) of applications. The system 300 includes an exchange infrastructure (XI) 310 for collaborative processing among internal components (ICs) 302 of an enterprise, and between external components (ECs) 304 that communicate to one or more ICs 302 through a firewall 305. The ICs and ECs 302 and 304 represent any of a number of processes or services and their software and hardware, such as Web portals, buying or selling programs, electronic mail, business management programs, project planning programs, and the like, and are preferably Web-based applications. Each of the ICs/ECs 302, 304 communicates via messaging with one or more other components according to at least one of a number of communication protocols or standards. The message system may handle many different types of messages (e.g., invoices, orders, pictures, XML messages, WSDL messages, SOAP messages, etc.).

The XI 310 is a self-contained, modularized exchange platform for driving collaboration among the components 302, 304. The XI 310 includes a central integration repository and directory storing shared collaboration knowledge. The XI 310 supports open standards such as various standard markup languages like the extensible markup language (XML), web service description language (WSDL), and simple object access protocol (SOAP) to provide an abstraction of technical interfaces for the components 302, 304, and for message-based communications across heterogeneous component interfaces. The self-contained, modularized functions of the XI 310 can be provided as one or more Web services based on standard Internet technology, and therefore can be published, discovered, and accessed within a network of components 302, 304 using open standards.

A persistence layer for a message exchange system of an application integration system may be provided. The message exchange system may include a message transport layer configured to transport messages from at least one sending application to one or more receiving applications, and a business process layer configured to execute business process logic on select ones of the messages processed by the message transport layer. The persistence layer may be accessible by both the message transport layer and the business process layer.

In one variation, a copy and drop technique is used for deleting data in the persistence layer of a messaging system. The first step is to copy needed messages in a new data container (e.g., tables in a database), and then drop the current data container from which the data was copied. In order for the technique to be advantageous, more messages should be deleted than copied. Also, the time to delete the messages should be higher than the time to create a new data container, copy the needed messages from the current data container in the new data container, and drop the current data container. In another variation, the messaging system may monitor the performance of the copy and drop mechanism, and if these conditions are not met, switch to another technique for deleting messages in the persistence layer.

In another variation, two tables (data containers) are used to copy and drop messages. Unlike typical systems, the copy and drop phases may be performed while the messages are being processed, without the need to stop the message processing, which may improve the speed and performance of the persistence layer in the messaging system.

Figure 4:
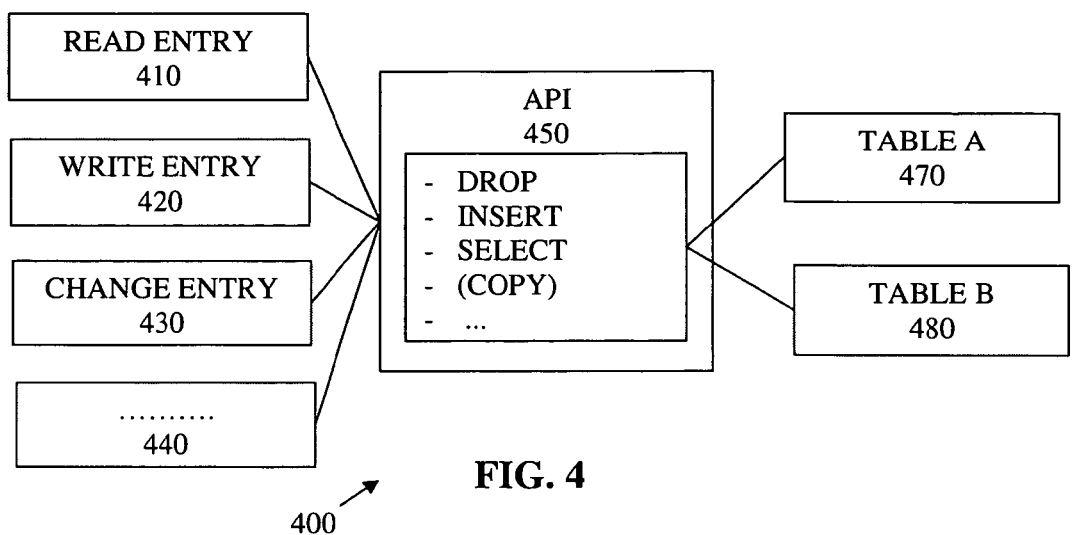
FIG. 4 is a block diagram illustrating a drop and delete mechanism in a messaging system persistence layer useful for implementing and understanding the claimed subject matter.

As shown in FIG. 4, the data container 470, 480 may be encapsulated in an application programming interface (API) 450 that interfaces with applications external to the message handling system. Needed messages may be copied from Table A ("current container") 470 to Table B ("new data container") 480 and then the entire Table A is deleted in a fast delete operation. Thereafter, Table B 480 is the current container. The copy phase and the drop phase can run parallel with the message processing obviating the need to stop message processing.

The API 450 may handle "Read Entry" 410, "Write Entry" 420, "Copy Entry" 430, and other queries 450. The API 450 may utilize SQL functions such as DROP, INSERT, SELECT, and COPY to control access to the data containers in which the messages are stored.

The determination of whether messages should be deleted or copied may take into account various factors. In one variation, a determination is first made whether the number of messages for deleting within a current data container (or other storage receptacle) exceeds the total number of messages minus the number of messages for deleting. An additional margin or threshold may be added or subtracted respectively requiring a greater or lesser number of messages to be deleted to ensure that there is a sufficient number of potential overfill messages for deletion.

If it is determined that the messages for deleting exceeds the total number of messages minus the number of messages for deleting, then it is determined whether the amount of time required to delete the messages for deleting will exceed the amount of time required to copy the other messages. One technique for estimating the amount of time required to delete the messages is to multiply the number of messages by an estimation or average of the amount of time required to delete a single message. The amount of time required to copy the messages other than those for deletion may be estimated by multiplying the number of such messages by an estimation or average of the amount of time required to copy a single message. Optionally, an amount of time required to drop one data container may also be added to this calculation. Furthermore, an amount of time required to create a new data container may be also added to this calculation.

The subject matter described herein may be implemented in digital electronic circuitry, or in computer hardware, firmware, software, or in combinations of them. Apparatus of the subject matter described herein may be implemented in a computer program product tangibly embodied in an information carrier (e.g., a machine-readable storage device or in a propagated signal, for execution by a programmable processor) and method steps of the subject matter described herein may be performed by a programmable processor executing a program of instructions to perform functions of the subject matter described herein by operating on input data and generating output. The computer program product may transmit data and instructions to, a storage system, at least one input device, and at least one output device. The subject matter described herein may be implemented in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

A number of variations of the subject matter described herein have been described. Nevertheless, it will be understood that various modifications may be made without departing from the scope of the subject matter described herein. For example, the techniques described herein may be used as part of a standalone system or they may be used on a network node that is coupled to multi-user network such as a LAN, WAN, or other type of distributed computing network. Accordingly, other variations are within the scope of the following claims.

What is claimed is:

1. A method for minimizing an elapsed time to delete messages stored in a messaging system, the method being implemented by one or more data processors and comprising:

determining, by at least one data processor, a number of messages not designated for deletion within a current data container within a messaging persistence layer of the messaging system;

determining, by at least one data processor, whether a quantity of messages designated for deletion within the current data container within the messaging persistence layer of the messaging system exceeds a predetermined threshold;

calculating, by at least one data processor, a first amount of time required to delete the messages designated for deletion, based on the quantity of messages designated for deletion and an average amount of time to delete a single message;

calculating, by at least one data processor, a second amount of time required to copy messages not designated for deletion in the current data container to a new data container within the messaging persistence layer of the messaging system, the second amount of time being based on the number of messages not designated for deletion and an average amount of time to copy a single message and based on an amount of time to drop the current data container and to generate the new data container;

determining, by at least one data processor, whether the first amount of time is less than the second amount of time or whether the second amount of time is less than the first amount of time or whether the first amount of time is equal to the second amount of time;

when the second amount of time exceeds the first amount of time, deleting, by at least one data processor, the messages designated for deletion; and when the first amount of time either exceeds the second amount of time or is equal to the second amount of time, copying, by at least one data processor, the messages not designated for deletion into the new data container and deleting the current data container;

wherein each data container comprises a table within a database.

2. The method of claim 1, wherein the predetermined threshold is based on a ratio of a number of the messages designated for deletion to a number of the messages not designated for deletion and delays in outputting messages from the current data container.

3. The method of claim 1, wherein the messages designated for deletion are deleted only when the second amount of time exceeds the first amount of time plus a predetermined threshold.

4. The method of claim 1, wherein the messages not designated for deletion are copied only when the first amount of time exceeds the second amount of time plus a predetermined threshold.

5. The method of claim 1, wherein the current data container or the new data container is encapsulated in an application programming interface.

6. The method of claim 1, wherein messages are processed concurrently with the determining, calculating, and deleting.

7. The method of claim 1, further comprising designating, by at least one data processor, messages to be deleted based on an amount of time since the messages were processed.

8. The method of claim 1, further comprising designating, by at least one data processor, messages to be deleted based on a second number of messages within the current data container.

9. The method of claim 1, further comprising designating, by at least one data processor, messages to be deleted based on an amount of free storage within the current data container.

10. The method of claim 1, wherein the messages are chosen from a group comprising: invoices, orders, pictures, XML messages, WDSL messages, and SOAP messages.

11. The method of claim 1, wherein further messages are marked for deletion based on an amount of time elapsed since processing of the message, a number of the messages stored in the current data container, and an amount of free storage within the current data container.

12. The method of claim 1, further comprising minimizing, by at least one data processor, the elapsed time to delete the messages stored in the messaging system.

13. A non-transitory computer program product for minimizing an elapsed time to delete messages stored in a messaging system, embodied on a machine-readable storage device, that includes executable instructions for causing a computer system to:

determine a number of messages not designated for deletion within a current data container within a messaging persistence layer of the messaging system;

determine whether a quantity of messages designated for deletion within the current data container within the messaging persistence layer of the messaging system exceeds a predetermined threshold;

calculate a first amount of time required to delete the messages designated for deletion, based on the quantity of messages designated for deletion and an average amount of time to delete a single message;

calculate a second amount of time required to copy messages not designated for deletion in the current data container to a new data container within the messaging persistence layer of the messaging system, the second amount of time being based on the number of messages not designated for deletion and an average amount of time to copy a single message and based on an amount of time to drop the current data container and to generate the new data container;

determine whether the first amount of time is less than the second amount of time or whether the second amount of time is less than the first amount of time or whether the first amount of time is equal to the second amount of time;

when the second amount of time exceeds the first amount of time, deleting the messages designated for deletion; and when the first amount of time either exceeds the second amount of time or is equal to the second amount of time, copying the messages not designated for deletion into the new data container and deleting the current data container;

wherein each data container comprises a table within a database.

14. A method for implementation by one or more data processors comprising:

exchanging, by at least one data processor, a plurality of messages among applications in a messaging system, the messaging system comprising a message transport layer to transport messages from at least one sending application to one or more receiving applications, a business process layer to execute business process logic on selected messages processed by the message transport layer, and a messaging persistence layer accessible by both the message transport layer and the business process layer;

determining, by at least one data processor, a number of messages not designated for deletion within a current data container within the messaging persistence layer of the messaging system;

determining, by at least one data processor, whether a quantity of messages designated for deletion within the current data container within the messaging persistence layer of the messaging system exceeds a predetermined threshold;

calculating, by at least one data processor, a first amount of time required to delete the messages designated for deletion, based on the quantity of messages designated for deletion and an average amount of time to delete a single message;

calculating, by at least one data processor, a second amount of time required to copy messages not designated for deletion in the current data container to a new data container within the messaging persistence layer of the messaging system, the second amount of time being based on the number of messages not designated for deletion and an average amount of time to copy a single message and based on an amount of time to drop the current data container and to generate the new data container;

determining, by at least one data processor, whether the first amount of time is less than the second amount of time or whether the second amount of time is less than the first amount of time or whether the first amount of time is equal to the second amount of time;

when the second amount of time exceeds the first amount of time, deleting the messages designated for deletion; and when the first amount of time either exceeds the second amount of time or is equal to the second amount of time, copying the messages not designated for deletion into the new data container and deleting the current data container;

wherein each data container comprises a table within a database.

* * * * *